United States Patent [19]

Pape et al.

[11] Patent Number: 4,825,301

[45] Date of Patent: Apr. 25, 1989

[54] APPARATUS FOR ENCODING AND DECODING HIGH RESOLUTION STILL IMAGES AND VIDEO IMAGES FOR RECORDING ON A STANDARD STORAGE MEDIA

[75] Inventors: David D. Pape; Allan C. Green, both of Framingham, Mass.

[73] Assignee: Polaroid Corporation, Cambridge, Mass.

[21] Appl. No.: 74,773

[22] Filed: Jul. 16, 1987

[51] Int. Cl.[4] .............................................. H04N 5/76
[52] U.S. Cl. ................................... 358/335; 358/906; 358/213.26
[58] Field of Search ............ 358/335, 339, 44, 213.22, 358/213.26–213.29, 906; 360/35.1, 33.1, 9.1

[56] References Cited

U.S. PATENT DOCUMENTS

| | | | |
|---|---|---|---|
| 4,009,331 | 2/1977 | Goldmark et al. | 358/127 |
| 4,232,329 | 11/1980 | Horak et al. | 358/9 |
| 4,358,786 | 11/1982 | Pfleiderer et al. | 358/310 |
| 4,500,915 | 2/1985 | Koike et al. | 358/44 |
| 4,513,313 | 4/1985 | Kinoshita et al. | 358/44 |
| 4,603,350 | 7/1986 | Arbeiter et al. | 358/140 |
| 4,691,253 | 9/1987 | Silver | 358/335 X |

Primary Examiner—L. T. Hix
Assistant Examiner—D. Rutledge
Attorney, Agent, or Firm—Edward S. Roman

[57] ABSTRACT

Apparatus for encoding electronic still image information signals to a form suitable for recording on a conventional recording media by dividing the electronic information signals into a plurality of groups of electronic information signals wherein each group corresponds to a plurality of different picture elements of the still image. Decoding apparatus is also provided for recording the electronic information signals from the different groups into their original order so as to enable reconstruction of the still image. The encoding apparatus may also be adapted to transmit conventional electronic video image information signals interspersed with the selectively encoded electronic still image information signals for recording on the conventional storage media. The decoding apparatus operates to separate the electronic still image information signals from the electronic video image information signals prior to decoding.

17 Claims, 3 Drawing Sheets

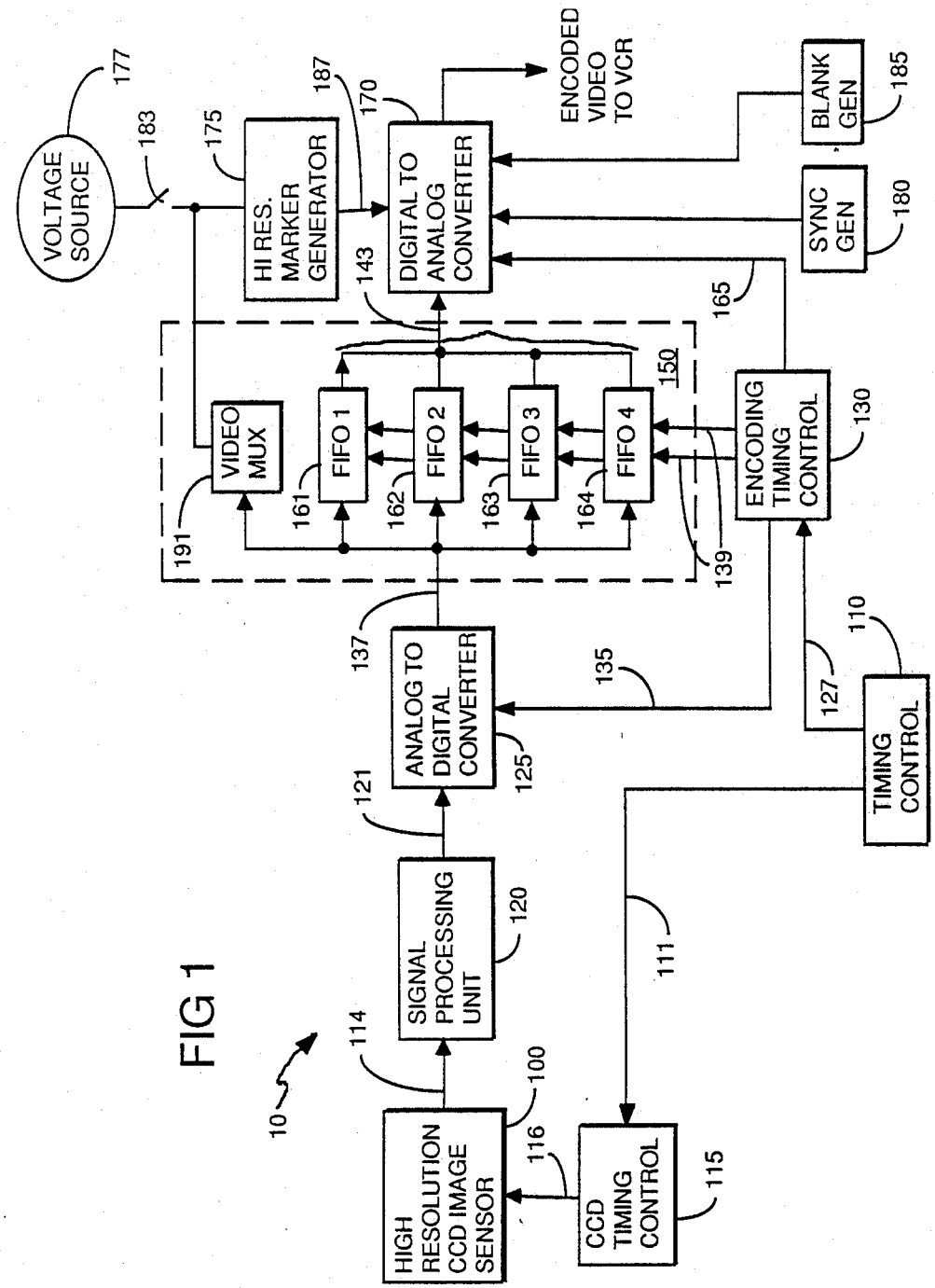

500   $A_1 B_1 C_1 D_1\ A_2 B_2 C_2 D_2\ A_3 B_3 C_3 D_3\ A_4 B_4 C_4 D_4 \bullet\bullet\bullet$ $\bullet\bullet\bullet A_{288}\ B_{288}\ C_{288}\ D_{288}$

INSIDE CCD - DECIMATE BY FOUR

501   $A_1$      $A_2$      $A_3$      $A_4 \bullet\bullet\bullet$
502     $B_1$      $B_2$      $B_3$      $B_4 \bullet\bullet\bullet$
503       $C_1$      $C_2$      $C_3$      $C_4 \bullet\bullet\bullet$
504         $D_1$      $D_2$      $D_3$      $D_4 \bullet\bullet\bullet$

ENCODER
LINE FIFO

| | | | | |
|---|---|---|---|---|
| 601 | 1 | 161 | $A_1\ A_5\ A_9\ A_{13}\ \bullet\bullet\bullet\ A_{281}\ A_{285}$ |
| 602 | 2 | 162 | $A_2\ A_6\ A_{10}\ A_{14}\ \bullet\bullet\bullet\ A_{282}\ A_{286}$ |
| 603 | 3 | 163 | $A_3\ A_7\ A_{11}\ A_{15}\ \bullet\bullet\bullet\ A_{283}\ A_{287}$ |
| 604 | 4 | 164 | $A_4\ A_8\ A_{12}\ A_{16}\ \bullet\bullet\bullet\ A_{284}\ A_{288}$ |
| 605 | 5 | 161 | $B_1\ B_5\ B_9\ B_{13}\ \bullet\bullet\bullet\ B_{281}\ B_{285}$ |
| 606 | 6 | 162 | $B_2\ B_6\ B_{10}\ B_{14}\ \bullet\bullet\bullet\ B_{282}\ B_{286}$ |
| 607 | 7 | 163 | $B_3\ B_7\ B_{11}\ B_{15}\ \bullet\bullet\bullet\ B_{283}\ B_{287}$ |
| 608 | 8 | 164 | $B_4\ B_8\ B_{12}\ B_{16}\ \bullet\bullet\bullet\ B_{284}\ B_{288}$ |
| 609 | 9 | 161 | $C_1\ C_5\ C_9\ C_{13}\ \bullet\bullet\bullet\ C_{281}\ C_{285}$ |
| 610 | 10 | 162 | $C_2\ C_6\ C_{10}\ C_{14}\ \bullet\bullet\bullet\ C_{282}\ C_{286}$ |
| 611 | 11 | 163 | $C_3\ C_7\ C_{11}\ C_{15}\ \bullet\bullet\bullet\ C_{283}\ C_{287}$ |
| 612 | 12 | 164 | $C_4\ C_8\ C_{12}\ C_{16}\ \bullet\bullet\bullet\ C_{284}\ C_{288}$ |
| 613 | 13 | 161 | $D_1\ D_5\ D_9\ D_{13}\ \bullet\bullet\bullet\ D_{281}\ D_{285}$ |
| 614 | 14 | 162 | $D_2\ D_6\ D_{10}\ D_{14}\ \bullet\bullet\bullet\ D_{282}\ D_{286}$ |
| 615 | 15 | 163 | $D_3\ D_7\ D_{11}\ D_{15}\ \bullet\bullet\bullet\ D_{283}\ D_{287}$ |
| 616 | 16 | 164 | $D_4\ D_8\ D_{12}\ D_{16}\ \bullet\bullet\bullet\ D_{284}\ D_{288}$ |

FIG 2

APPARATUS FOR ENCODING AND DECODING HIGH RESOLUTION STILL IMAGES AND VIDEO IMAGES FOR RECORDING ON A STANDARD STORAGE MEDIA

TECHNICAL FIELD OF THE INVENTION

The present invention relates to apparatus for encoding high resolution still image sensor output signals in a form compatible foro use with a conventional VCR and decoding the resulting encoded signals to display the high resolution still image.

BACKGROUND OF THE INVENTION

High resolution solid state image sensors such as charge-coupled devices (CCD), charge-injection-detectors (CID), and so forth, are finding increasing use as imaging elements for cameras. Such high resolution image sensors produce a large number of pixels for each horizontal scan line of their output, for example, 1146 pixels.

A conventional low resolution TV video signal allows only 53.5 $\mu$'s for encoding the information contained in each horizontal line of output. Thus, if 1146 pixels from the above signal is encoded in the time provided by the low resolution video format, a bandwidth equal to (1146/2)/53.2 $\mu$'s or approximately 10.75 MHz is required. Such a bandwidth far exceeds the capability of a conventional video-cassette-recorder (VCR) tape used for video tape recording, since the luminance bandwidth of such recorders is limited to approximately 2 MHz. As a result, any CCD camera having more than 200 horizontal pixels in a continuous horizontal readout will exceed the recording capability of most conventional VCR's.

At present, in transferring the output of a high resolution sensor to a conventional VCR tape, a large percentage of the image sensor output signal is typically lost as a result of the signal being constrained by the bandwidth limitations of the VCR and, as a consequence, a substantial amount of resolution is lost.

The above-described situation limits the use of VCR recorders for taking high resolution still pictures. However, as described above, the limitation occurs as a result of the limitations inherent to the conventional VCR.

Therefore, it is a primary object of this invention to provide an apparatus for converting a high resolution still image sensor output signal to a format which is compatible for storage in a conventional VCR and which can be distinguished from a low resolution video output signal.

It is a further object of this invention to provide a method and apparatus for interspersing conventional TV video signals with high resolution still image signals on the same video tape thereby permitting the use of a high resolution camera to video tape scenes for replay on a typical CRT monitor and to intersperse the low resolution video images with high resolution still images which can be detected and displayed on the same monitor.

Other objects of the invention will be, in part, obvious and will, in part, appear hereinafter. The invention accordingly comprises a system possessing the construction, combination of elements and arrangement of parts which are exemplified in the following detailed disclosure.

SUMMARY OF THE INVENTION

The present invention relates to an apparatus for encoding electronic still image information signals of the type which can be provided from an image sensor having a plurality of image sensing areas or pixels arranged in rows and columns for recording on a conventional recording media. The encoding apparatus comprises means for selecting a substantially like number of different electronic image information signals for each of a plurality of different groups of electronic image information signals wherein the electronic image information signals of each group correspond, respectively, to a select order of different pixels of the image sensor. The pixels of each group are spaced apart along a row of the image sensor by at least one pixel from each of the other groups of electronic image information signals for that row.

Means are also provided for storing a plurality of different groups of electronic image information signals. A timing means thereafter operates to retrieve the groups of electronic image information signals in a selected sequence from the storing means to provide an output signal for recording one group at a time on a conventional recording media.

The invention further includes a decoding apparatus for decoding electronic still image information signals recorded in the aforementioned manner. The decoder includes means for receiving and storing a plurality of different groups of electronic still image information signals. Timing control means are also included for controlling the transmission of the electronic information signals from the storing means in a select order so that each succeeding electronic still image information signal corresponds to a succeeding pixel in the rows of pixels which ultimately comprise the select scene defined by the electronic information signals.

The encoding apparatus of the invention may also be adapted to transmit conventional electronic video image information signals and selectively encode electronic still image information signals of a type which can be provided by the aforementioned sensor. The encoding apparatus of this type preferably includes means responsive to selective actuation by a user for providing a distinctive electronic information signal immediately prior to the second output signal so as to facilitate recognition of the electronic still image information signal relative to the conventional electronic video image information signal.

The decoding apparatus for this invention may also be used for decoding electronic still image information signals recorded in the aforementioned manner by detecting the occurrence of the distinctive electronic information signal.

BRIEF DESCRIPTION OF THE DRAWINGS

A complete understanding of the present invention may be gained by considering the following detailed description in conjunction with the accompanying drawings, in which:

FIG. 1 shows a block diagram of a high resolution VCR image encoder system which utilizes an embodiment of the present invention;

FIG. 2 shows the pixel sequence output from a high resolution image recorder and the pixel encoding scheme used in one embodiment of the present invention.

To facilitate understanding, identical reference numerals are used to designate elements common to the figures.

DETAILED DESCRIPTION

Figure 3:
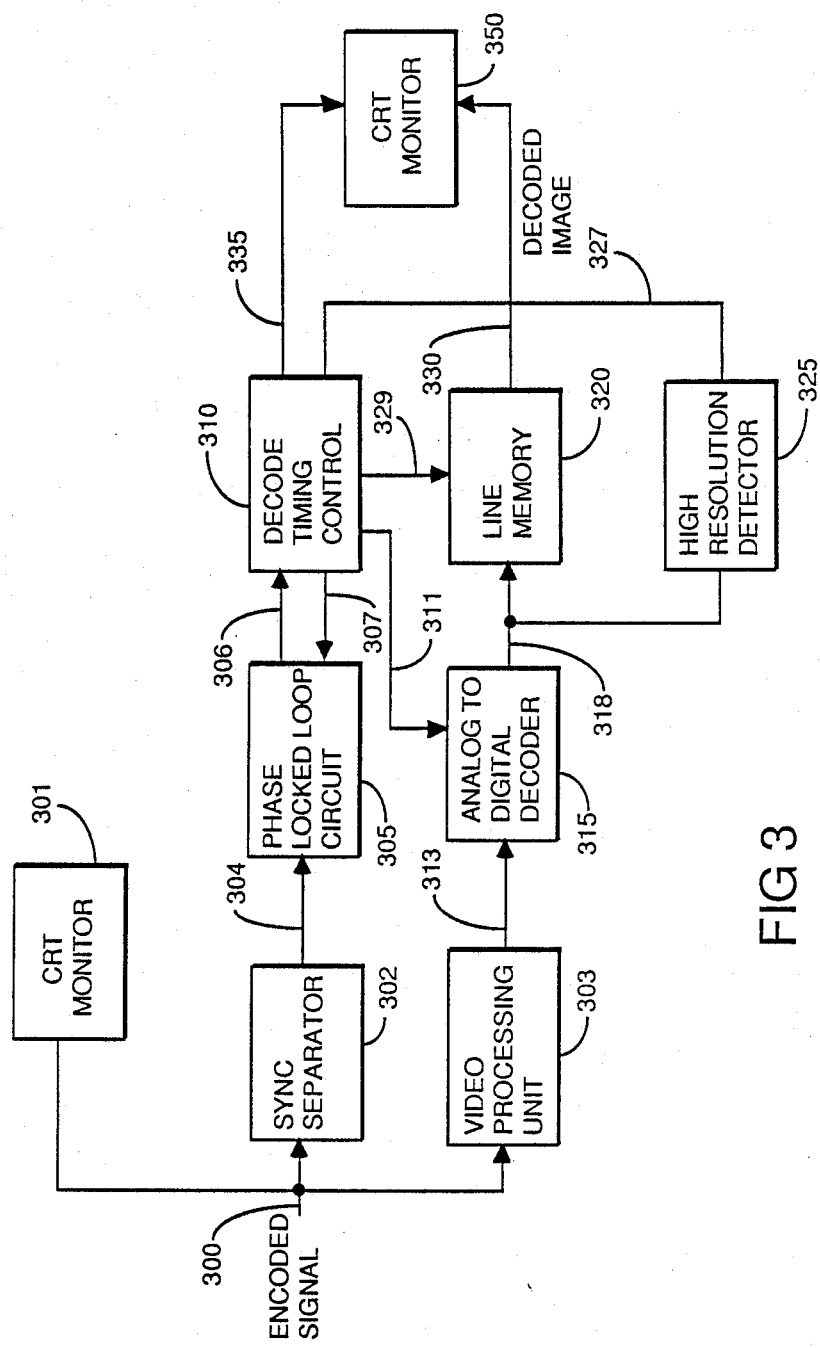
FIG. 3 shows a block diagram of a high resolution VCR image decoder system which utilizes an embodiment of the present invention.

FIG. 1 shows a block diagram of a high resolution VCR still image encoder system 10 which includes an embodiment of the present invention. A high resolution CCD image sensor 100 scans an image and produces sequential horizontal scan lines thereof. Although this embodiment shows a CCD image sensor, it should be clear to those of ordinary skill in the art that a wide variety of other types of high resolution image sensors may be used with embodiments of the present invention.

FIG. 2 shows the pixel sequence output from the high resolution CCD image sensor 100 and the pixel encoding scheme used in one embodiment of the present invention. Line 500 in FIG. 2 shows the pixel sequence produced as the high resolution CCD image sensor 100 scans a horizontal line of an image. In the illustrative example shown in FIG. 2, the pixels on line 500 fall into four groups, i.e., every fourth pixel belongs to a different pixel group. The pixel groups in line 500 are denoted as group A, group B, group C, and group D and the pixels in each group are denoted with sequential subscripts. Thus, as shown in FIG. 2, the pixels contained in one horizontal scan line of the image are denoted as $A_1$, $B_1$, $C_1$, $D_1$, $A_2$, $B_2$, $C_2$, $D_2$ and so forth.

Further, as shown in FIG. 2, the pixels of line 500 are decimated by four within the high resolution CCD image sensor 100 in a well-known manner into serial groups, i.e., group A shown in line 501, group B shown in line 502, group C shown in line 503, and group D shown in line 504. It should be clear to those of ordinary skill in the art that it is not necessary to decimate the high resolution scan line inside the high resolution CCD image sensor 100 and/or to decimate the high resolution scan line into any particular number of groups. For example, the 4:1 decimation accomplished within the high resolution CCD image sensor 100 can be accomplished by a wide variety of circuitry which is well known to those of ordinary skill in the art and which is not incorporated directly within the high resolution CCD image sensor 100. Further, the first 4:1 decimation could also be a 2:1 decimation, an 8:1 decimation, and so forth.

In FIG. 1, a timing control 110 sends a signal over lead 111 to a CCD timing control 115 and, in response thereto, CCD timing control 115 sends timing signals over lead 116 to the high resolution CCD image sensor 100. The timing signals transmitted from the CCD timing control 115 cause the high resolution CCD image sensor 100 to scan a horizontal line of an image and to generate the above-described four groups of pixels illustrated on lines 501–504 of FIG. 2 corresponding to the scanned horizontal line. Further, in a well-known manner, the high resolution CCD image sensor 100, in response to signals from the timing control 110 and the CCD timing control 115, scans an appropriate number of horizontal lines, 488 in this example, required to provide a high resolution image. In this manner an entire image is scanned and electrical signals corresponding to the pixels thereby are generated.

The CCD timing control 115 also generates a signal after each horizontal line has been scanned and decimated into the four groups. In response to this signal, the high resolution CCD image sensor 100 outputs the groups of pixels, one group at a time. The electrical signals corresponding to the pixels and defining the image sensed are applied over lead 114 as an input signal to a signal processing unit 120. The signal processing unit 120 is well known in the art and conditions the electrical signals representing each pixel output from the high resolution CCD image sensor 100 into a form which is suitable for further processing. For example, the signal processing unit 120 may increase the range of the voltage levels of the image defining signal output from the high resolution CCD image sensor 100 to a range of values which are suitable for analog-to-digital conversion. The signal processing unit 120 applies the analog signals representing the groups of pixels over lead 121 as an input to an analog-to-digital converter 125.

The timing control 110 applies a signal over lead 127 to an encoder timing control 130. The encoder timing control 130, in turn, sends timing signals over lead 135 to the analog-to-digital converter 125. The analog-to-digital converter 125 converts the analog image defining signal output format from the signal processing unit 120 into a digital signal format. The digital signal output from analog-to-digital converter 125 represents sequential pixels from each group and is applied over lead 137 as an input to an encoder 150. It should be clear to those of ordinary skill in the art that the number of bits used to represent each of the analog pixel signal values is a design choice and a wide variety of different choices may be used, all being within the spirit of the present invention. Further, it should be clear to those of ordinary skill in the art that the analog-to-digital converter 125 may be embodied in any number of methods well known in the art.

The encoder 150 in FIG. 1 comprises four first-in-first-out (FIFO) register devices 161–164. It should be clear to those of ordinary skill in the art that a variety of different numbers of FIFO's may be used, all being within the spirit of the present invention. Digital data representing the values of pixel signals are output from the analog-to-digital converter 125 and applied as inputs to FIFO's 161–164 in response to signals applied over leads 139 from the encoder timing circuit 130. In accordance with the present invention, the digital value of successive pixels in a group are stored in successive FIFO's 161–164. This is illustrated in lines 601 - 616 of FIG. 2.

As shown in FIG. 2, each high resolution horizontal scan line 500 is broken down into 16 subgroups. For example, lines 601–604 show that each one of the FIFO's 161–164 stores one fourth of the pixels from group A. However, in accordance with the present invention, successive pixels from group A are not stored in the same FIFO, but are stored in successive FIFO's. Thus, as shown in lines 1–4 of FIG. 2, pixel $A_1$ is stored in FIFO 161 whereas pixel $A_2$ is stored in FIFO 162 and so forth. As a result, in the specific embodiment of the present invention shown in FIGS. 1 and 2, FIFO's 161–164 are filled until each contains signal information corresponding to 72 pixels from group A of the pixels for the horizontal scan line 500 of the high resolution CCD image sensor 100.

When the signal information corresponding to all the pixels from a particular group are stored within the FIFO's 161–164, the encoder timing control 130 sends signals to FIFO's 161–164 over leads 139 which cause the FIFO's to transmit the stored signal values of the pixels, one FIFO at a time. The digital values for each pixel in the sequence transmitted from a FIFO are applied over lead 143 to input a digital-to-analog converter 170. In accordance with the present invention, signals corresponding to the pixels are transmitted from the FIFO's sequentially so that the signals corresponding to all the pixels stored in FIFO 161 are transmitted to the digital-to-analog converter 170 before any signals from FIFO 162. After FIFO's 161–164 are emptied of signals for all the pixels of the first group, the signals for the pixels from the next succeeding group are read in and so forth as shown in lines 1–6 of FIG. 2.

The digital-to-analog converter 170, in response to a signal applied over lead 165 from the encoder timing control 130, converts all digital signals for each pixel from a FIFO into an analog signal which is compatible with any well-known conventional VCR tape format. In the specific embodiment described in FIGS. 1 and 2, each of the FIFO's 161–164 stores 72 pixel subgroups contains electronic still image information signals corresponding to a select order of different pixels of the image sensor 100 where the pixels of each subgroup are spaced apart along a row of the image sensor 100 by at least one pixel from each of the other subgroups of the electronic still image information signals for that row. The signals for each subgroup of 72 pixels are converted from a digital format to an analog format by the digital-to-analog converter 170 and encoded into a conventional horizontal scan line format for recording by any conventional VCR onto video tape. This encoding occurs in response to a conventional television synchronization signal which is applied as an input to the digital-to-analog converter 170 from a sync generator 180 and a conventional television blanking signal which is applied as an input to the digital-to-analog converter 170 from a blank generator 185.

Thus, as discussed above, each high resolution horizontal scan line is encoded into 16 subgroups for recording by a conventional VCR onto video tape in a conventional horizontal scan line format. Further, if each high resolution image contains 488 horizontal scan lines, as is the case in this embodiment, then the high resolution image is encoded into 7808 conventional VCR tape compatible horizontal scan lines plus some additional lines which provide synchronziation in a manner well known in the art.

A high resolution marker generator 175, in response to a signal from a voltage source 177 which is connected when a user closes switch 183, generates a distinctive set of digital pixel signals which correspond to a predetermined number of conventional horizontal scan lines. The distinctive digital pixel signals are applied over lead 187 to input the digital-to-analog converter 170. The digital-to-analog converter 170 converts the distinctive digital pixel signals into an analog signal format for a predetermined number of horizontal scan lines which analog signal is suitable for recording on a conventional VCR tape. This distinctive set of pixel signals is typically generated as the first set of scan lines which is stored on the conventional VCR tape before the encoded high resolution image. As a result, a decoder to be hereinafter described detects the distinctive set of pixel signals in order to distinguish between the above-described high resolution encoded still images and conventional low resolution video images which may be interleaved on the same tape.

As further illustrated in FIG. 1, a further embodiment of the encoder 10 includes a video mux 191 which receives the signals for pixels from each group from the analog-to-digital converter 125. The video mux 191 then outputs a conventional low resolution video signal in which the signals for a number of the pixels from the high resolution scan line are eliminated. As shown in FIG. 1, the video mux 191 is normally operative and provides a conventional video signal to a monitor (not shown) that may be viewed by the user. While viewing the monitor (not shown), the user any capture a high resolution still image by closing the switch 183 which renders the video mux 191 inoperative and initiates the above-described high resolution encoding process starting with the generation of the distinctive set of digital pixel signals. In this manner the user is able to interleave conventional low resolution TV video images with high resolution still images on a conventional storage medium such as a VCR tape.

It should be clear to those of ordinary skill in the art that FIG. 1 illustrates merely one embodiment of an encoder and many other embodiments can be fabricated which are all within the spirit of the present invention. For example, it should be clear to those of ordinary skill in the art that any or all of FIFO's 161–164 can be replaced by memory storage devices, for example, random access memory (RAM) devices. In such instances, as long as the speed of operation is commensurate with providing a suitable signal for storage on a medium such as a conventional VCR tape, such alternative embodiments may be used.

FIG. 3 shows a block diagram of a high resolution still image decoder system 20 which includes an embodiment of the present invention. A video signal encoded in the aforementioned manner of this invention as shown at 300 which, for example, is recorded on a conventional VCR tape is applied as an input to a CRT monitor 301, a sync separator 302 and a video processing unit 303. The sync separator 303 detects horizontal synchronization pulses from the video signal input in a manner well known to those of ordinary skill in the art. The sync separator 302 applies the synchronization pulses over lead 304 as an input to a phase locked loop circuit 305. In response to the signal applied thereto over lead 304, the phase locked loop circuit 305 generates a signal which is applied over lead 306 as an input to a decode timing control 310 and receives a signal over lead 307 from the decode timing control 310. The decode timing control 310, in response to the output from the phase locked loop 305 applied over lead 306, applies an accurate timing control signal over lead 311 as an input to an analog-to-digital converter 315, which timing control signal is used to retrieve signals for pixels in a select ordered sequence from the input video signal.

The video processing unit 303 conditions the video signal 300 into a signal whose voltage range is suitable for application to a conventional analog-to-digital converter 315. The conditioned signal from video processing unit 303 is applied over lead 313 as an input to the analog-to-digital converter 315. The analog-to-digital converter 315, in response to the timing signal applied thereto over lead 311 from the decoder timing control 310, converts the analog format of the incoming video signal for each pixel into a digital format. In this embodiment each pixel is encoded into 8 bits in a manner well known in the art, although it will be recognized by those of ordinary skill in the art that this is merely a design choice and is not intended to restrict the invention in any manner.

As shown in FIG. 3, digitally encoded pixels are applied over lead 318 to input a line memory 320, which, for example, may comprise a RAM, in response to the timing signal applied thereto over lead 311 from the decode timing control 310. In addition, the digitally encoded signals for the pixels are applied as an input to a high resolution detector 325. The high resolution detector 325 determines whether the aforementioned distinctive set of pixel signals which identifies the beginning of a high resolution still image has been encoded into the video signal. If the distinctive identifier is detected, the high resolution detector 325 applies a signal over lead 327 to input the decode timing control 310. This signal alerts the decode timing control 310 to the fact that an encoded high resolution still image will be arriving subsequently.

In response to timing signals applied over lead 320 as an input to the memory 320, the line memory 320 stores the signals for pixels from a number of horizontal scan lines corresponding to all the groups and subgroups required to rebuild a high resolution horizontal scan line. In accordance with the description given above regarding the inventive encoder, such a high resolution scan line is formed from the signals for pixels from the 16 conventionally recorded horizontal scan lines each of which has one subgroup recorded thereon. The signals for the pixels in the 16 subgroups are first rearranged into the appropriate sequential arrangement for each of the aforementioned four groups and then these four groups are rearranged to form the appropriate sequential arrangement for the high resolution scan line.

The line memory 320 outputs an appropriately arranged high resolution horizontal line scan over lead 330 to a CRT display monitor 350 in which the high resolution still image may be viewed. The monitor 350 may be any one of a large number of different display devices including a high definition T.V. Alternatively to the monitor, there may be provided a still image memory or another type of data receiver, or a hard copy printer. In this manner, high resolution still pictures may be made, in a manner well known to those of ordinary skill in the art.

Clearly, those skilled in the art recognize that further embodiments of the present invention may be made without departing from its teachings. Therefore, it is intended that all matter contained in the above description or shown in the accompanying drawings shall be interpreted as illustrative and not limiting. For example, the order in which the subgroups of signals for pixels are placed on the conventional storage medium is not critical since the high resolution still image horizontal scan line is reasssembled from the several conventionally recorded horizontal line scans by the decoder.

What is claimed is:

1. Apparatus for encoding electronic still image information signals of the type which can be provided from an image sensor having a plurality of image sensing areas or pixels arranged in rows and columns for recording on a conventional recording media comprising:

timing control means for selecting a substantially like number of different electronic still image information signals for each of a plurality of different groups of electronic still image information signals wherein the electronic still image information signals of each group correspond, respectively, to a select order of different pixels of the image sensor, said pixels of each group being spaced apart along a row of the image sensor by at least one pixel from each of the other groups of electronic still image information signals for that row; and means for storing said plurality of different groups of electronic still image information signals, said timing control means being thereafter operative for retrieving said groups of electronic still image information signals one group at a time in a selected sequence from said storing means to provide an output signal for recording one group at a time on a conventional recording media.

2. The apparatus of claim 1 wherein the conventional recording media is of the type used in a conventional video recorder and said apparatus comprises means for providing a conventional television synchronization signal and a conventional television blanking signal and for incorporating said television synchronization signal and said television blanking signal into said output signal so as to render said output signal compatible for recording by the conventional video recorder in a manner whereby the electronic still image information signals for each of said groups is recorded on the storage media on a space corresponding to the space on which a conventional video line scan could otherwise be recorded.

3. The apparatus of claim 2 wherein the conventional video recorder is a video cassette recorder and the conventional recording media is video cassette recorder tape.

4. The apparatus of claim 3 wherein the electronic still image information signals received from the image sensor are in analog format and said apparatus includes first converter means for converting the analog format of the electronic still image information signals to a digital format prior to storage in said storing means, and second converter means for converting the digital format of the electronic still image information signals subsequently retrieved from said storing means back to an analog format, said converter means also operating to incorporate said conventional television syncrhonization signal and said conventional television blanking signal into said output signal.

5. The apparatus of claim 4 wherein said storing means comprises a plurality of first-in-first-out register devices each connected with respect to said timing control means to receive, store and subsequently transmit select ones of said groups of electronic still image information signals.

6. Apparatus for decoding electronic still image information signals defining a select scene comprised of a plurality of picture elements or pixels arranged in rows and columns wherein the electronic still image information signals are of the type which are recorded on a conventional recording media in different groups each group corresponding, respectively, to pixels spaced apart along a row of pixels by at least one pixel from each of the other groups of electronic still image information signals for that row and each group being recorded one at a time in a select sequence, said decoding apparatus comprising:

means for receiving a plurality of different groups of electronic still image information signals one group at a time in the select sequence in which the groups were recorded and thereafter storing the plurality of the different groups of electronic still image information signals; and timing control means for controlling the transmission of said electronic still image information signals from said storing means in a select order so that each succeeding electronic still image information signal corresponds to a succeeding pixel in the rows of pixels which ultimately comprise the select scene defined by the electronic information signals.

7. The decoding apparatus of claim 6 wherein the conventional recording media is of the type used in a conventional video recorder, and the electronic still image information signals are combined with a conventional television synchronization signal and a conventional television blanking sigal, said decoding apparatus also comprising means for separating the conventional television synchronization signal from the electronic still image information signal to provide a control signal to said timing control means.

8. The decoding apparatus of claim 7 wherein the electronic still image information signals to be decoded are in an analog format and said decoding apparatus further includes a converter for converting the analog format of the electronic still image information signal to a digital format prior to storage within said storage means.

9. Apparatus for transmitting conventional electronic video image information signals and selectively encoding electronic still image information signals of a type which can be provided from an image error having a plurality of image sensing areas or pixels arranged in rows and columns for recording on a conventional recording media comprising:
   selectively interruptable means for transmitting the electronic video image information signals to provide a first output signal for recording on a conventional recording media;
   timing control means responsive to the selective interruption of said transmitting means for selecting a substantially like number of different electronic still image information signals for each of a plurality of different groups of electronic still image information signals wherein electronic still image information signals of each group correspond, respectively, to a select order of different pixels of the image sensor, said pixels of each group being spaced apart along a row of the image sensor by at least one pixel from each of the other groups of electronic still image information signals for that row; and
   means for storing said plurality of different groups of electronic still image information signals, said timing control means being thereafter operative for retrienving said groups of electronic still image information signals one group at a time in a selected sequence from said storing means to provide a second output signal for recording one group at a time on a conventional recording media.

10. The apparatus of claim 9 further including means responsive to said selective interruption for providing a distinctive electronic information signal immediately prior to said second output signal so as to facilitate recognition of said second output signal relative to said first output signal.

11. The apparatus of claim 10 wherein the conventional recording media is of the type used in a conventional video recorder and said apparatus comprises means for providing a conventional television synchronization signal and a conventional television blanking signal into said second output signal so as to render said second output signal compatible for recording by the conventional video recorder in a manner whereby said distinctive electronic information signals are first recorded on the storage media on a space corresponding to the space on which at least one conventional video line scan of said first output signal would otherwise be recorded and said electronic still image information signals are subsequently recorded on the storage media on a succeeding space also corresponding to the space on which conventional video line scans of said first output signal would otherwise be recorded on.

12. The apparatus of claim 11 wherein the conventional video recorder is a video cassette recorder and the conventional recording media is a video cassette recorder tape.

13. The apparatus of claim 12 wherein the conventional electronic video image information signals and the electronic still image information signals received from the image sensoro are both in analog format and said apparatus includes first converter means for converting the analog format of the conventional electronic video image information signals and the electronic still image information signals to a digital format prior to storage of the electronic still image information signals in said storing means, and second converter means for converting the digital format of the conventional electronic video image information signals and the electronic still image information signals subsequently retrieved from said storing means back to an analog format, said converter means also operating to incorporate said conventional television synchronization signal and said conventional television blanking signal into said output signal.

14. The apparatus of claim 13 wherein said storing means comprises a plurality of first-in-first-out register devices each connected with respect to said timing control means to receive, store and subsequently transmit select ones of said groups of electronic still image information signals, said apparatus further including a video multiplexer for receiving and transmitting the conventional electronic video information signals in digital format.

15. Apparatus for decoding electronic still image information signals defining a select scene comprised of a plurality of picture elements of pixels arranged in rows and columns from conventional electronic video information signals wherein the conventional electronic video information signals are both of the type which can be recorded in spaced relation on a conventional recording media, the electronic still image information signals being immediately preceded by a distinctive electronic information signal and also being divided into different groups each group corresponding, respectively, to pixels spaced apart along a row of pixels by at least one pixel from each of the other groups of electronic image information signals for that row and each group being recorded one at a time in a select sequence, said decoding apparatus comprising:
   means for receiving and storing a plurality of different groups of electronic still image information signals;
   means for detecting the occurrence of the distinctive electronic information signal and providing a select output in response thereto; and
   timing control means responsive to said select output control signal for inputting said storing means with the plurality of different groups of electronic still image information signals one group at a time in the select sequence in which the groups were recorded and thereafter controlling the transmission of said electronic still image information signals from said storing means in a select order so that each succeeding electronic still image information signal corresponds to a succeeding pixel in the rows of pixels which ultimately comprise the select scene defined by the electronic still image information signal.

16. The decoding apparatus of claim 15 wherein the conventional recording media is of the type used in a conventional video recorder and the electronic still image information signals are combined with a conventional television synchronization signal and a conventional television blanking signal, said decoding apparatus also comprising means for separating the conventional television synchronization signal from the electronic still image information signal to provide a control signal to said timing control means.

17. The decoding apparatus of claim 16 wherein the distinctive electronic information siganls and the electronic still image information signals are both in an analog format and said decoding apparatus further includes a converter for converting the analog format of the distinctive electronic information signals and the electronic still image information signals to a digital format prior to detection by said detecting means and storage within said storage means, respectively.

* * * * *